Aug. 17, 1926.  
H. L. JOHNSON  
1,596,044  
SPLIT ANCHOR SOCKET  
Filed May 1, 1922
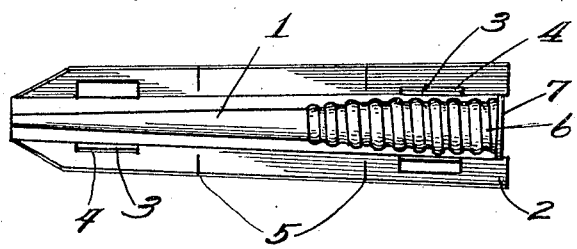
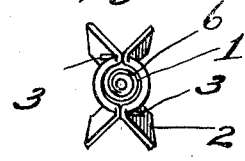
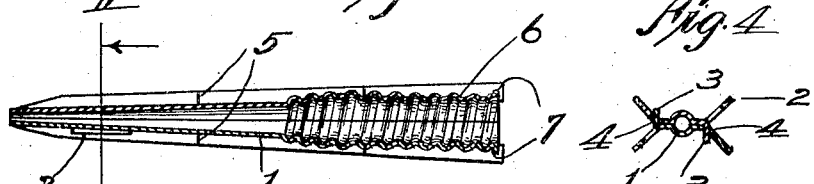
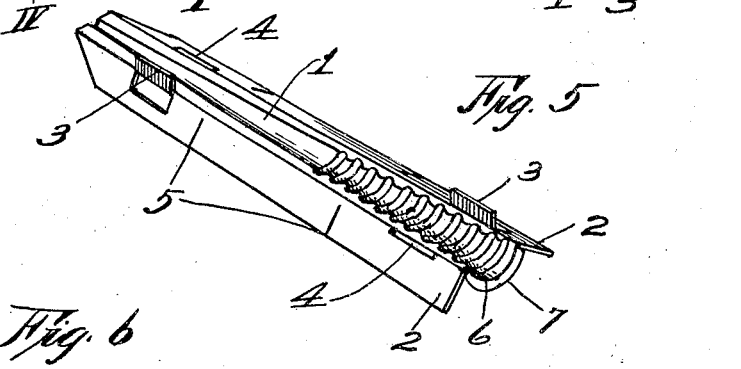
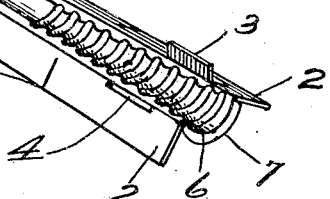
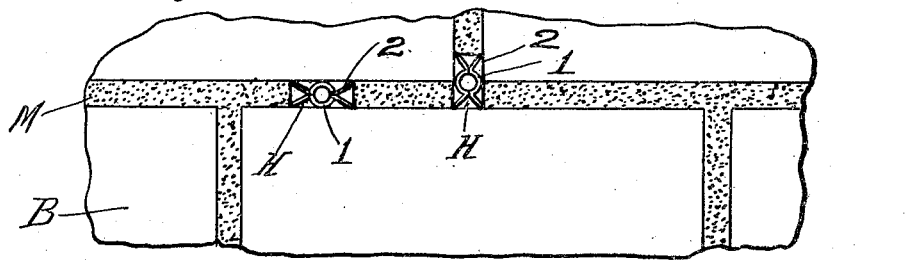
Witness:  
R. E. Hamilton
Inventor:  
Harry L. Johnson  
By Thorpe & Leonard  
Attys Patented Aug. 17, 1926.

1,596,044

UNITED STATES PATENT OFFICE.

HARRY L. JOHNSON, OF KANSAS CITY, MISSOURI.

SPLIT ANCHOR SOCKET.

Application filed May 1, 1922. Serial No. 557,535.

This invention relates to anchor sockets for use in securing the threaded ends of screws or the like in position in a concrete or masonry wall, and the chief object of the invention is to provide an anchor for the threaded ends of brackets for the support of electric cables, wires and other appliances.

Another object is to produce a device of the character set forth which is adapted for use more particularly in joints in stone or brick work.

A still further object is to provide an anchor of simple, strong, durable, efficient and inexpensive construction; and in order that it may be fully understood, reference is to be had to the accompanying drawing, in which:—

Figure 1 is a top plan view of an anchor device embodying the invention;

Figure 2 is an end view of the same;

Figure 3 is a central vertical section through the device as it appears in Figure 1;

Figure 4 is a section on the line IV—IV of Figure 3;

Figure 5 is a perspective view of one of the members of the device; and

Figure 6 is a view of a wall and shows applied thereto a pair of the anchor devices.

Referring now to the drawing in detail, in which like reference characters identify corresponding parts in all of the figures, 1 indicates a relatively concave member tapering from one end to the other and formed at its side margins with downwardly bent wings 2 for the purpose which will hereinafter appear. Adjacent each end and at opposite sides of the longitudinal center of the device are tongues 3 and diametrically opposite each of said tongues is a slot 4, said tongues and slots being cut out of the wings 2 where the latter join the body of the member 1, in such a manner that when a pair of the devices are placed in abutting relation to provide a tapered passage, the tongues and slots of the two members will interlock and reliably hold the members against longitudinal movement or side slip with respect to each other.

The side wings 2 are split as at 5 to make them more flexible in order that when inserted in position, as will hereinafter appear, such wings may more readily adapt themselves to the irregularities of the cavity in which the anchor device is fitted.

The larger ends of the concave channels of the members 1 are threaded as at 6 so as to conjointly form a threaded socket for the reception of the threaded end of a screw or the like, and the outer end of the threaded portion of the members are flanged outward as at 7 so as to leave the wings projecting in order that when the anchoring device is driven into a cavity made to receive it, the ends of the wings will receive the impact of the blows and thus protect the threaded portion from such injury or distortion as would make it difficult to properly insert wood screws or the like.

When in use an irregular shaped opening H is first drilled in the wall by the use of any suitable tool, preferably in the case of a masonry wall in the mortar. A pair of the devices with their tongues and slots interlocked is now forced by hammering, if necessary, into the opening, and during this operation the wings 2 will be bent to conform to the irregularities in the walls of the cavity, the splits 5 allowing the wings to more readily adapt themselves to the openings and at the same time offer additional resistance to the withdrawal of the device. It will be understood, in this connection, that the device is preferably made of a light and thin metal.

The threaded end of a screw (not shown) or the like, is now engaged with the threaded bore 6 of the anchor, and it will be evident that as the screw is screwed into position, the members 1 will be forced apart due to their tapering construction, and the wings 2 will be forced to conform to the irregular walls of the cavity and the device will be permanently and rigidly locked in position.

It will be apparent that the anchor will be held in position upon the removal of a screw, and that, therefore, the anchor is permanent in character. It is also desirable to point out that the members forming each anchor are duplicates in construction, leading to a saving in manufacturing costs and also in costs of installation, as the worker will not be compelled to make sure that he has cooperating members before preparing to insert an anchor in the wall.

From the above description it will be apparent that I have produced a device of the character described, which possesses all of the features of advantage set forth as desirable, and while I have described and claimed the preferred embodiment of the same, I reserve the right to make all changes properly falling within the spirit and scope of the appended claims.

I claim:

1. A device of the character described comprising a tapering socket composed of a pair of like members having adjacent diverging longitudinal wings; each member having diametrically opposite tongues and slots, the tongues of each member engaging the slots of the other member.

2. A device of the character described comprising a tapering socket composed of a pair of like members having adjacent diverging longitudinal wings, each wing being transversely split; each member having diametrically opposite tongues and slots, the tongues of each member engaging the slots of the other member.

3. A device of the character described comprising a tapering socket terminating at its small end in a driving point composed of a pair of like members having interengaging elements to allow movement of said members toward and from each other without dislocation of such members, and a plurality of pliable wings carried by each of said members and projecting radially outward therefrom.

4. A device of the character described comprising a tapering socket composed of a pair of like members, the small end of said socket constituting a driving point, and each member of the socket having diverging longitudinal wings adapted for bending upon forcing the socket into position.

5. A device of the character described comprising a tapering socket terminating at its smaller end in a driving point, composed of a pair of like members, and a plurality of pliable wings carried by said members and projecting radially outward therefrom.

In witness whereof I hereunto affix my signature.

HARRY L. JOHNSON.